United States Patent [19]
Olynyk

[11] Patent Number: 5,363,479
[45] Date of Patent: Nov. 8, 1994

[54] SYSTEM AND METHOD FOR RENDERING BEZIER SPLINES

[75] Inventor: Kirk O. Olynyk, Redmond, Wash.

[73] Assignee: Microsoft Corporation, Redmond, Wash.

[21] Appl. No.: 909,101

[22] Filed: Jul. 2, 1992

[51] Int. Cl.⁵ .............................................. G06F 15/00
[52] U.S. Cl. .................................................... 395/142
[58] Field of Search ................ 395/142, 141; 345/135, 345/136, 16, 17

[56] References Cited

U.S. PATENT DOCUMENTS

| | | | |
|---|---|---|---|
| 4,620,287 | 10/1986 | Yam | 364/518 |
| 4,903,014 | 2/1990 | Yoshida | 340/727 |
| 5,239,591 | 8/1993 | Ranganath | 382/6 |

*Primary Examiner*—Phu K. Nguyen
*Attorney, Agent, or Firm*—Seed and Berry

[57] ABSTRACT

A high speed and memory efficient method and system for determining with a computer when a curve defined by a set of Bézier, control points is sufficiently approximated by a line segment so that the reduction of the Bézier curve into smaller curves can stop. The method is readily implemented on a computer using vectors formed using vector addition and subtraction and is applicable to Bézier curves of any order.

42 Claims, 7 Drawing Sheets

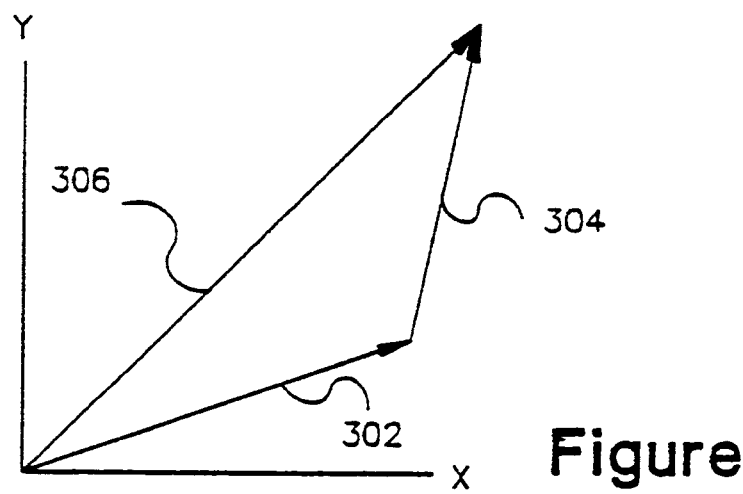
Figure 7a
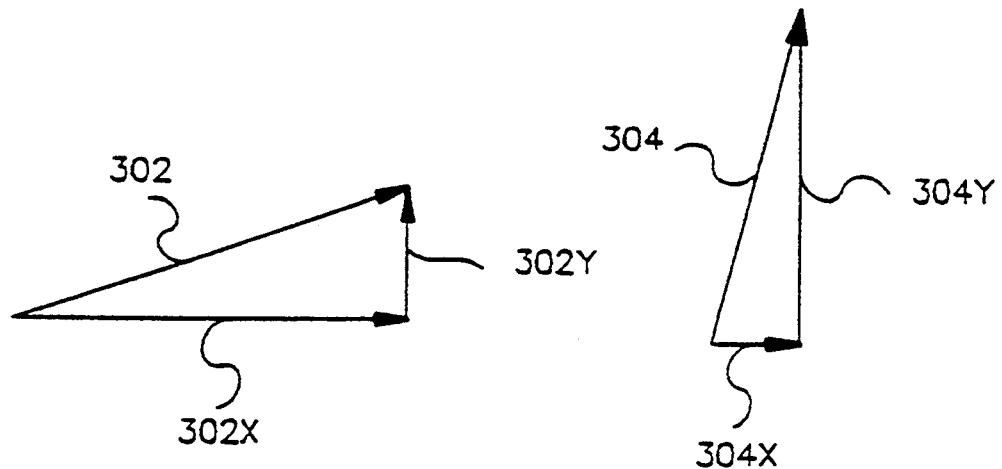
Figure 7b
Figure 7c
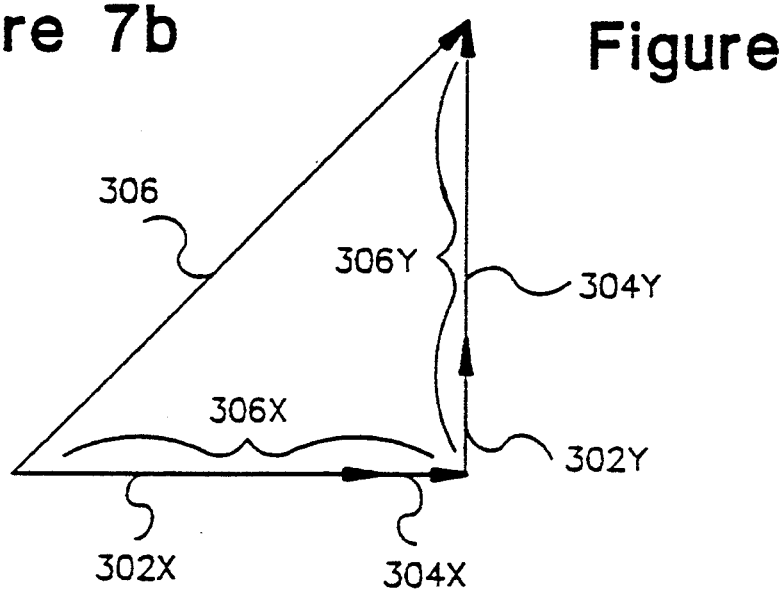
Figure 7d

SYSTEM AND METHOD FOR RENDERING BEZIER SPLINES

TECHNICAL FIELD

The present invention relates to a system and method for rendering Bézier splines. More specifically, the present invention relates to a system and method for simulating a curve on a computer graphics system by approximating a Bézier spline with a finite sequence of straight line segments.

BACKGROUND OF THE INVENTION

Computer systems are highly useful for compiling and assimilating large amounts of data. Computer systems frequently include graphic displays capable of displaying curves. FIG. 1 illustrates a curve 2 that may be displayed on a typical graphics display system.

Graphics display systems generally include a memory for storing a digital representation of the curve to be displayed. In a primitive system this might include an extremely large memory that stores a digital value which represents the curve to be displayed. A high-resolution display system using this method would require an extremely large memory. Such a primitive system would be too slow when initially generating the digital values which represent the curve, and would also be slow when manipulating the curve, such as when the curve is rotated or relocated on the display. Because of these problems, many computer display systems utilize the Bézier spline method of modeling curves.

A Bézier spline, often referred to as a Bézier curve, is a mathematical construct for curves and curved surfaces. The most frequently used Bézier curve for two-dimensional graphic systems is the cubic Bézier curve. A cubic Bézier curve requires four control points which define the curve. Once the four points are specified, the curve is defined. However, as is well known to those skilled in the art, higher order Bézier curves may be used to create highly complex curves in two, three or higher dimensions.

To use cubic Bézier curves to construct an arbitrary curve such as curve 2 of FIG. 1, the curve may be partitioned into a number of individual arcs. This is illustrated in FIG. 1 wherein the curve 2 is divided into three arcs. Between points 4 and 6 curve 2 is divided into an arc 8, between points 6 and 10 curve 2 is divided into an arc 12, and between points 10 and 14 curve 2 is divided into an arc 16. To construct the arc 8 using a cubic Bézier curve, the arc end points 4 and 6 plus two additional points, control points 18 and 20, are selected. By properly selecting the control points 18 and 20 and the end points 4 and 6, the arc 8 can be generated using a well known reiterative process. This process is repeated for arcs 12 and 16 and their selected control points. Thus, the curve 2 can be defined by ten Bézier control points. In a similar manner, almost any desired curve can be generated from a set of selected control points using the Bézier curve technique.

While Bézier curves permit a curve to be described by a small set of data points, when the Bézier curve itself is to be displayed on a display screen the data values for the sequence of points on the display screen, called pixels, that trace out the curve must be specified. Since determining each and every data point on an arc of a curve is a slow, computationally inefficient process, it has been found highly beneficial to approximate the Bézier curve. An advantage of doing this is that the Bézier curve can be approximated very closely by a finite set of line segments. The number of line segments required depends upon several factors including the rate of curvature of the desired curve and the resolution of the display screen. Approximating an arc by a finite set of straight lines segments is particularly advantageous because determining the set of points comprising a line segment can be done very efficiently. The reduction of a Bézier curve into a set of straight line segments that approximates the curve, or at least an arc of the curve, is called "rendering" the curve.

Note that the above discussion is equally applicable to printers as well as display screens. The pixel size on a typical laser printer is different from the pixel size on a typical video display screen. However, the same problems encountered in rendering a Bézier curve on a display screen are present when rendering a curve on a laser printer or any other type of graphics printer.

A typical prior art method of rendering the Bézier curve is illustrated in FIG. 2 wherein an arc 22 is to be closely approximated by a set of line segments. Two control points referred to as end points 24 and 26 of the arc 22 together with control points 28 and 30 define the arc 22 via a cubic Bézier curve. These four control points are determined in a well known manner. The initial step in rendering the curve is to determine whether the line segment 38 extending between points 24 and 26 is a "close enough" approximation to the arc 22 that the line segment can be displayed as an approximation of the arc 22. If the line segments are within the resolution of the display screen (i.e., within a pixel of where the actual arc should be located on the screen), then further computations will yield no improvement in the display. The actual resolution depends on the display device. For example, on a typical video display terminal, there are 72 pixels per inch, while a laser printer has 300 or even 600 pixels per inch. Thus, the degree of accuracy of calculations depends on the display device.

A typical prior an method of determining the amount of error is to form a line segment 38 extending between points 24 and 26. Then the magnitude of a line segment 40, perpendicular to line segment 38 and extending through control point 28, and the magnitude of a line segment 42, also perpendicular to line segment 38 but extending through point 30, are determined. The magnitudes of the line segments 40 and 42 are then checked as to whether they are both smaller than a predetermined test magnitude, such as the dimension of one pixel. If line segments 40 and 42 are both smaller than the test magnitude, the line segment 38 is deemed to be a close enough approximation of the arc 22 that it can be displayed as the arc.

However, if the magnitude of either of the line segments 40 or 42 is greater than the test magnitude, the line segment 38 is not a sufficiently accurate representation of the arc 22 and is an unsuitable approximation of the arc for display purposes. In that event, the arc 22 is subdivided into two parts, each defined by four control points. The four control points for each part are determined as follows. First, the midpoint of each of line segments 32, 34, and 36 is determined, specifically points 44, 46, and 48, respectively. Next the midpoints of line segments extending between points 44 and 46 and between points 46 and 48 are determined, specifically points 50 and 52, respectively. Finally, the midpoint of a line segment 54 drawn between the points 50 and 52 is determined, that point being point 56. The arc 22 passes through point 56. At point 56, the arc 22 is tangent to the line segment 54 connecting points 50 and 52. The two portions of the arc 22 can now be defined.

The first portion 22a of arc 22 is defined using points 24, 44, 50, and 56 as Bézier control points and the second portion 22b of arc 22 is defined by using points 56, 52, 48, and 26 as Bézier control points. After the two portions 22a and 22b of arc 22 are found, the line segments between the Bézier end points 24 and 56 for curve portion 22a and 56 and 26 for curve portion 22b, respectively are then tested using the procedure described above to determine whether they are a sufficiently accurate approximation of their respective arc portions 22a and 22b that they can be used to display that portion of the arc 22. If one or more of the arc portions are not defined closely enough by a line segment drawn through the respective control points, the Bézier curve for that arc portion is subdivided using the above procedure. The procedure is reiterated until each portion of the arc 22 is deemed to be closely enough approximated for display purposes by a resulting set of line segments.

By continuing the above process it is possible to approximate the arc 22 to any desired degree of accuracy. It is very important to stop the rendering of the Bézier curve when a given set of line segments approximate the arc with sufficient accuracy that a more accurate set of line segments is not required. This is because of the very large number of mathematical operations required to render a highly accurate curve, because most computer graphics systems, whether display screens or printers, are typically low resolution devices, because the amount of memory required to store the resulting set of line segments grows quickly as the accuracy of the approximation increases, and because of the finite speed of computer graphic systems.

The above prior an technique of determining when a set of line segments closely approximates a Bézier curve is computationally inefficient. The prior art technique requires the determination of the lengths of the line segments 40 and 42. It requires in each reiteration finding of the shortest distance between two Bézier control points and a line segment, such as control points 28 and 30 and the line segment 38. To do this, the location of points 57 and 58 must be determined so that the magnitudes of the line segments 40 and 42 can be calculated. Calculating the location of points 57 and 58 is computationally inefficient; this inefficiency becomes highly pronounced when performed the large number of times required by some computer graphic displays when rendering the curve.

Another prior art method of rendering a Bézier curve is to repeatedly subdivide a curve, without performing a closeness test, until the individual line segments between control points are only one pixel long. This method results in a curve that is as accurate as the resolution of the display device and does not require a calculation and comparison of the line segment lengths described above. However, this technique often results in many more iterations of subdivision being performed than are truly necessary to satisfactorily approximate the curve. Thus, this technique also has the disadvantage of being slow.

Therefore, it would be useful to have a computationally efficient method of determining the accuracy with which a set of line segments approximate a Bézier curve.

SUMMARY OF THE INVENTION

The inventive method determines when a set of sequential line segments between Bézier curve end points sufficiently approximates a curve defined by the Bézier control points so that the error between the approximation and the actual curve is smaller than a specified test magnitude and the process of dividing the Bézier curve into smaller Bézier curves can stop. The method includes the steps of forming construction vectors between the Bézier control points, starting at one end of the curve. The first construction vector has a magnitude and direction defined by the magnitude and direction from the first to the second Bézier control points. Subsequent construction vectors have a magnitude and a direction defined by the magnitude and direction from the second to the third Bézier control points, and so on. A number of error vectors are formed, depending on the order of the Bézier curve. The first error vector has a magnitude and direction defined by subtracting the first construction vector from the second construction vector. Subsequent error vectors are defined by subtracting the second construction vector from the third construction vector, and so on. Finally, whether the line segment connecting the first Bézier control point with the last Bézier control point sufficiently approximates the curve defined by the Bézier control points is determined by comparing the magnitudes of the error vectors or functions of the error vectors with the test magnitude. If the magnitudes of each of the error vectors or error functions is smaller than the test magnitude, it is known that the set of sequential line segments sufficiently approximates the curve defined by the Bézier control points that further rendering of the curve is not necessary. If the magnitude of any of the error vectors or functions exceeds the test magnitude, the inventive method subdivides the Bézier curve according to techniques well known in the art, and applies the inventive method to each portion of the subdivided curve independently of other portions until all portions of the curve are rendered with sufficient accuracy.

The inventive method may be easily implemented on a computer. Computers are very efficient in addition and subtraction. The system of the present invention uses vector addition and subtraction to create error vectors. The system compares the magnitude of the error vectors to a preselected test magnitude and indicates whether the magnitude of any of the error vectors exceeds the test magnitude. If the magnitude of any of the error vectors exceeds the test magnitude, the system will subdivide the curve according to principles well known in the art and the system will create a new set of error vectors for each subdivided portion of the curve. The system analyzes error vector magnitudes independently for each portion of the curve until the magnitudes of all error vectors for that portion of the curve are each less than the test magnitude. At that point the system draws straight line segments between the Bézier control points that define that particular portion of the curve.

Other features and advantages of the present invention will become apparent from the following more detailed description, taken in conjunction with the accompanying drawings.

BRIEF DESCRIPTION OF THE DRAWINGS

FIG. 7a illustrates two typical vectors added together to produce a third vector. FIGS. 7b and 7c illustrate the X and Y rectangular components of the two vectors of FIG. 7a which are added together to produce the third vector. FIG. 7d shows the graphical solution of adding the X and Y components of the two vectors shown in FIGS. 7b and 7c.

DETAILED DESCRIPTION OF THE INVENTION

The present invention relates to the determination of when a set of line segments connecting Bézier curve end points is a sufficiently accurate approximation of a curve defined by the Bézier curve control points so that the process of dividing the Bézier curve into smaller curves can stop. The inventive method of determining whether a Bézier curve is sufficiently approximated by a line segment is performed in a computationally efficient manner. As with related prior art methods, the present invention requires that an accuracy value, hereinafter called the test magnitude, be predetermined. The test magnitude determines the degree of accuracy with which the line segments approximate the Bézier curve. The actual value of the test magnitude is usually selected in relation to the resolution of the graphics display screen or printer being used, although any test magnitude value can be used. If the line segments fall within a pixel of the actual curve, then the system can end the calculations because additional calculations will not yield a more accurate approximation. As previously discussed, the degree of resolution depends on the display device with a pixel on a video display having a different physical size than a pixel on a typical laser printer. The present invention works equally well with display devices of any resolution.

Figure 1:
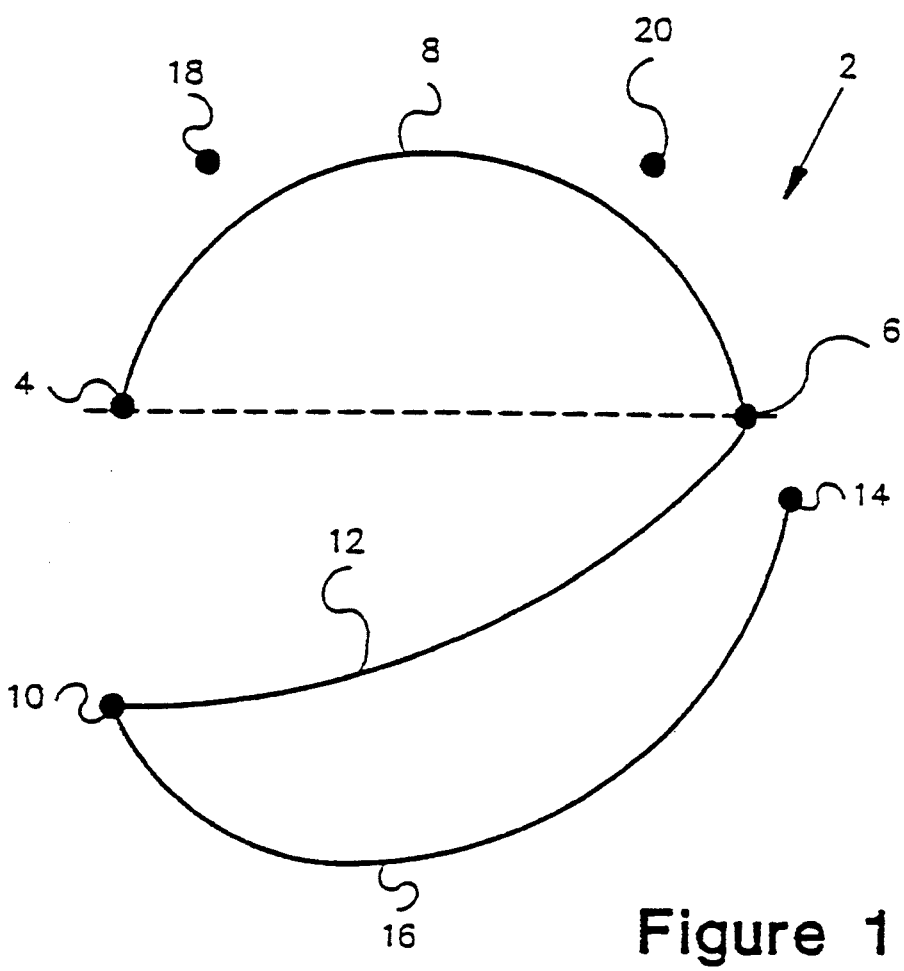
FIG. 1 is an illustration of how an arbitrary curve can be divided into a subset of smaller arcs.
Figure 2:
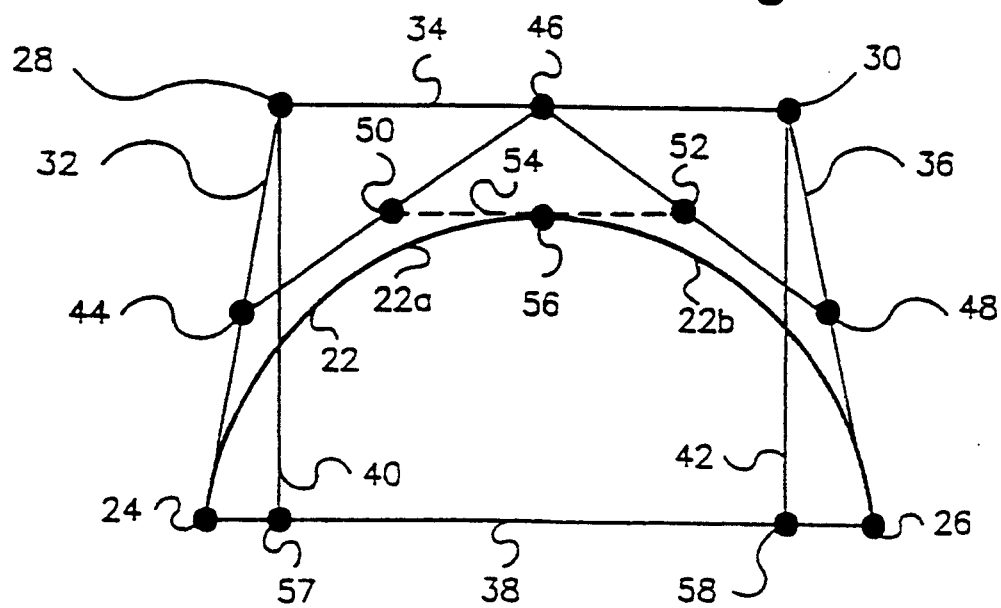
FIG. 2 illustrates an arc of the curve of FIG. 1 defined by a cubic Bézier curve, how that arc can be approximated by a single line segment connecting the first and last Bézier control points, and how a prior art method checks the approximation for accuracy.

The present invention relates to methods and systems for converting a curve defined by Bézier control points into a sequence of line segments. Thus, the present invention is embodied in the computer graphics system 100, shown in FIG. 3. A typical initial set of inputs to the Bézier curve renderer 116 is shown in FIG. 4, specifically, the four Bézier control points 200, 202, 204, and 206, which define a cubic Bézier curve 208. To assist in understanding the differences between the inventive methods and the prior art, the four control points, and curve 208 defined by those control points, are the same as the points 24, 26, 28, and 30, and the arc 22 of FIG. 2. A problem with using prior art methods to determine if line segment 38 of FIG. 2 is a sufficiently accurate approximation of the arc 22 is the computational inefficiency of determining the magnitudes of the line segments 40 and 42. At least part of this problem is related to the necessity of determining the location of points 57 and 58. The inventive methods avoids the necessity of finding comparable points and reduces all calculations to the determination of vector magnitudes, as will be described in detail below.

Figure 4:
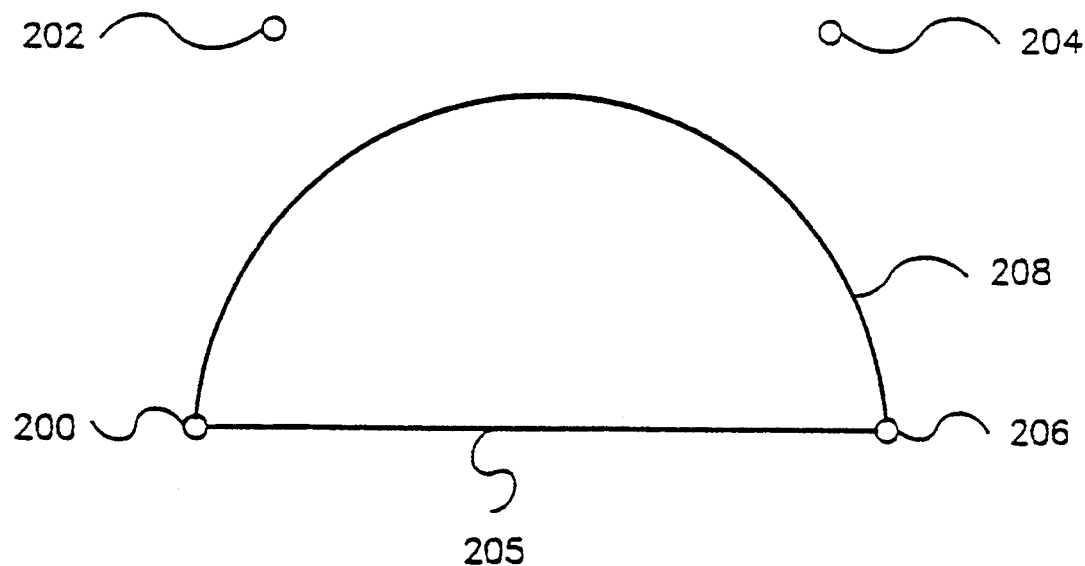
FIG. 4 illustrates the curve of FIG. 2 defined by four Bézier control points.
Figure 5:
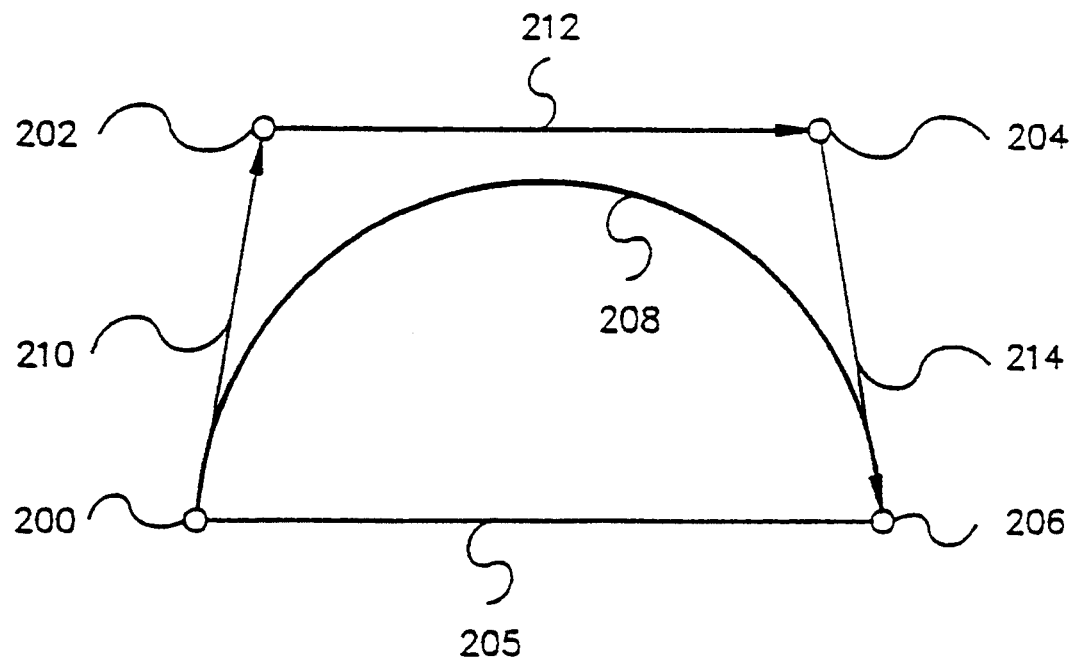
FIG. 5 illustrates the use of vectors in rendering the Bézier curve of FIG. 2.

The curve 208 in FIG. 4 is approximated by the line segment 205 drawn between Bézier end points 200 and 206. The system and method of the present invention relate to a technique for determining the accuracy of the approximation. According to a preferred embodiment of the invention, the four Bézier control points, 200, 202, 204, and 206 which define Bézier curve 208 are used to define three vectors as shown in FIG. 5. A first construction vector 210 is defined using the magnitude and direction from control point 200 to control point 202. A second construction vector 212 is defined using the magnitude and direction from control point 202 to control point 204. A third construction vector 214 is defined using the magnitude and direction from control point 204 to control point 206. As will be described below, in addition to these vectors, four other vectors 218, 220, 222, and 224 are shown in FIG. 6, and have magnitudes and directions defined relative to a selected origin 216 of the display screen being used and control points 200, 202, 204, and 206.

For ease of understanding, the operation of the invention will be described using a graphical solution, although in actuality the invention is practiced by the computer graphics system 100 (shown in FIG. 3) using vector mathematics. With these vectors defined, the first construction vector 210 is relocated so that its tail coincides with control point 202, thus creating vector 210'. The tip of vector 210' terminates at a point 226. The second construction vector 212 is relocated with its tail coincident with control point 204, thus creating a vector 212'. The tip of vector 212' terminates at a point 228. An error vector 230 is then defined with a magnitude and direction extending from the point 226 to the control point 204 by vector subtraction of the vector 210' from the vector 212. In addition to the error vector 230, another error vector 232 is defined with a magnitude and direction extending from the point 228 to the control point 206 by vector subtraction of the vector 212' from the vector 214.

Figure 6:
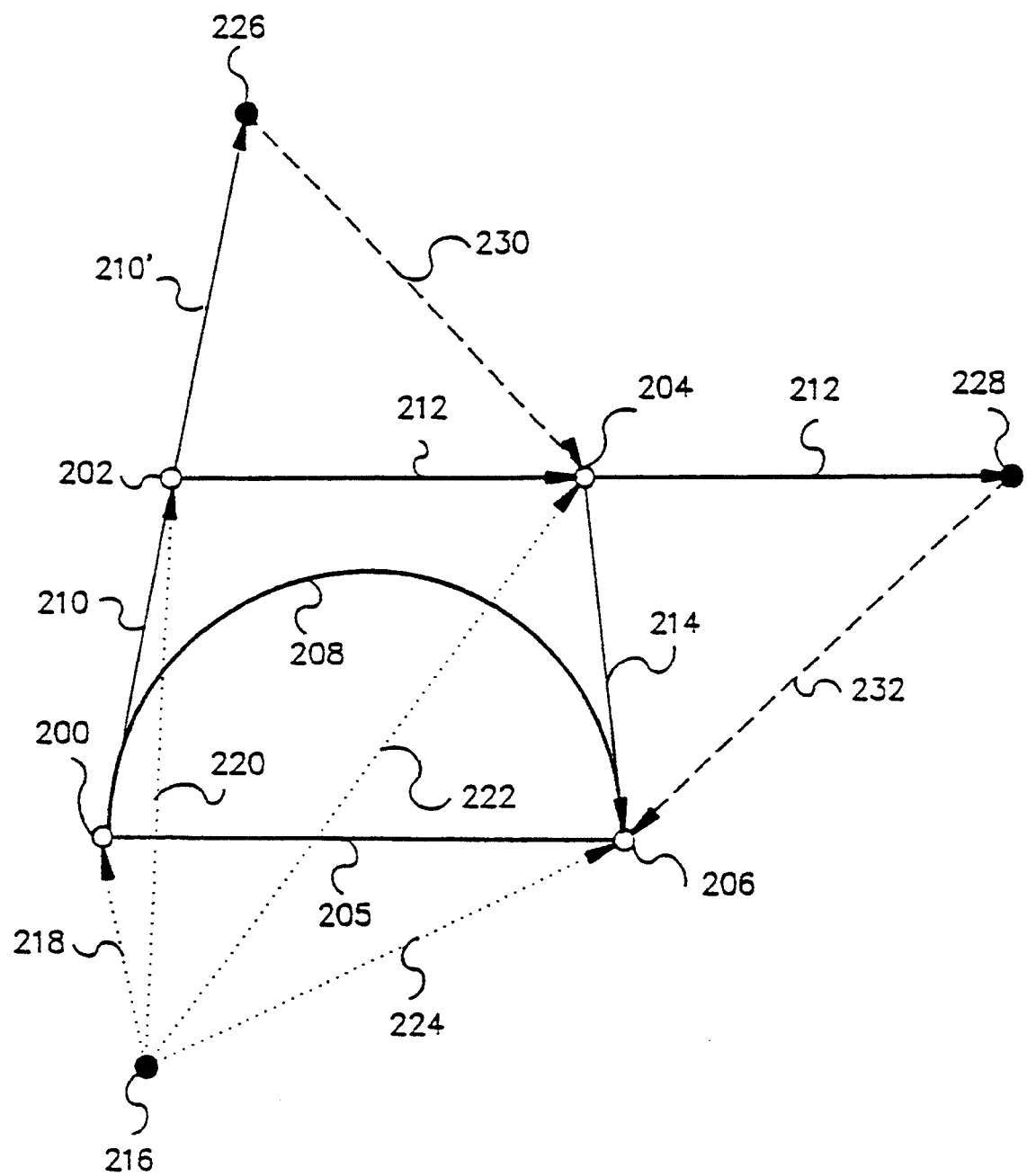
FIG. 6 illustrates the Bézier curve of FIG. 2 and the inventive method for determining the accuracy of the rendered curve.

The error vectors 230 and 232 can also be easily calculated as sums and differences of the other previously defined vectors relative to the origin 216 of the display screen, as shown in FIG. 6. Error vectors 230 and 232 can also be expressed in terms of vectors 218, 220, 222 and 224, as follows:

Error Vector 230 = Vector 212 − Vector 210'
 = (Vector 222 − Vector 220) − (Vector 220 − Vector 218)

-continued $$\text{Error Vector } 232 \begin{aligned} &= \text{Vector } 222 - 2(\text{Vector } 220) + \text{Vector } 218 \\ &= \text{Vector } 214 - \text{Vector } 212' \\ &= (\text{Vector } 224 - \text{Vector } 222) - (\text{Vector } 222 - \text{Vector } 220) \\ &= \text{Vector } 224 - 2(\text{Vector } 222) + \text{Vector } 220 \end{aligned}$$

In such fashion, the error vectors 230 and 232 are easily calculated even when making reference to an origin 216 which does not coincide with control point 200. With either approach, the same results are achieved.

The above explanation depicts the present invention using a graphical solution in order to more clearly define the nature of the invention. In simple mathematical terms, the error vector 230 is simply the difference between the first and second construction vectors 210 and 212, and is defined mathematically by subtracting the first construction vector 210 from the second construction vector 212. In the same manner, the error vector 232 is defined mathematically by subtracting the second construction vector 212 from the third construction vector 214. Of course, while the repositioned equivalent vectors 210' and 212' were used to facilitate a graphical solution, the mathematical results are the same whether using the repositioned vectors or the corresponding original construction vectors 210 and 212 discussed above. It should be noted that the principles of the present invention may be applied to a Bézier curve with the same results starting at either end of the curve.

According to a preferred embodiment of the present invention, the line segment 205 extending between the control points 200 and 206 will approximate the arc 208 sufficiently close when the magnitudes of both of the error vectors 230 and 232 are both less than the test magnitude. By using the magnitudes of the error vectors 230 and 232, it is no longer necessary to locate the points 57 and 58 and determine the magnitudes of the line segments 40 and 42 in FIG. 2 when determining whether the Bézier curve rendered is sufficiently accurate to be satisfactory for display.

It is clear to those of ordinary skill in the art that one could use as an error criterion, any function of the error vectors that becomes small if and only if both error vectors become small. For example, instead of the magnitude of the error vectors 230 and 232, one could look at the magnitude of any two linearly independent combinations of the two error vectors.

It is well known in mathematics that vectors may be resolved into their respective X and Y rectangular components and that the X and Y components of two vectors can be independently added or subtracted to arrive at the sum or difference of the vectors. In FIG. 7a, for example, vector 302 is shown added to vector 304 to produce vector 306. As shown in FIG. 7b, vector 302 may be resolved into an X component 302X, and a Y component 302Y. Similarly, as shown in FIG. 7c, vector 304 can be resolved into two components, 304X and 304Y. A graphical solution is illustrated in FIG. 7d, with vector 306 having an X component which is the sum of the X components 302X and 304X, and a Y component which is independently calculated and is the sum of the Y components 302Y and 304Y. Mathematically, this is represented by the following formulas:

$$\text{Vector } 306 = \text{Vector } 302 + \text{Vector } 304$$

$$\text{Vector } 306X = \text{Vector } 302X + \text{Vector } 304X$$

$$\text{Vector } 306Y = \text{Vector } 302Y + \text{Vector } 304Y$$

In a like manner, one vector may be subtracted from another vector by independently subtracting the X and Y components. It follows from the above description and FIGS. 7a–7d that the error vectors 230 and 232 can be determined using only addition and subtraction, functions which are very efficiently performed by computers.

It is noted that the actual magnitudes of the error vectors 230 and 232 is mathematically calculated by taking the square root of the sum of the squares of the X and Y components. This is a time and memory consuming calculation for a computer compared to simple addition and subtraction. In the preferred embodiment this calculation is not used to determine the actual magnitude of the error vectors 230 and 232 for comparison with the test magnitude, but rather the comparison is made using the larger of the X or Y component of each error vector. Thus, the magnitude (or scalar component) of the largest X or Y component of each of the error vectors 230 and 232 is compared to the test magnitude when determining whether the line segments are a close enough approximation to the Bézier curve that the line segments can be satisfactorily used to graphically represent the curve on the screen display or printer.

If either the magnitude of the X or Y component of the error vector 230 or the error vector 232 exceeds the test magnitude, further subdivision of the Bézier curve is required. However, when both the X and Y components of both of the error vectors 230 and 232 are less than the test magnitude, the line segment 205 between control points 200 and 206 is a sufficiently close approximate to the Bézier curve 208 that it can be used for display purposes. This, of course, requires that the test magnitude be selected with the understanding that it will be compared with the magnitude of the largest X or Y component of the error vectors 230 and 232, rather than to the magnitude of these error vectors.

Figure 8:
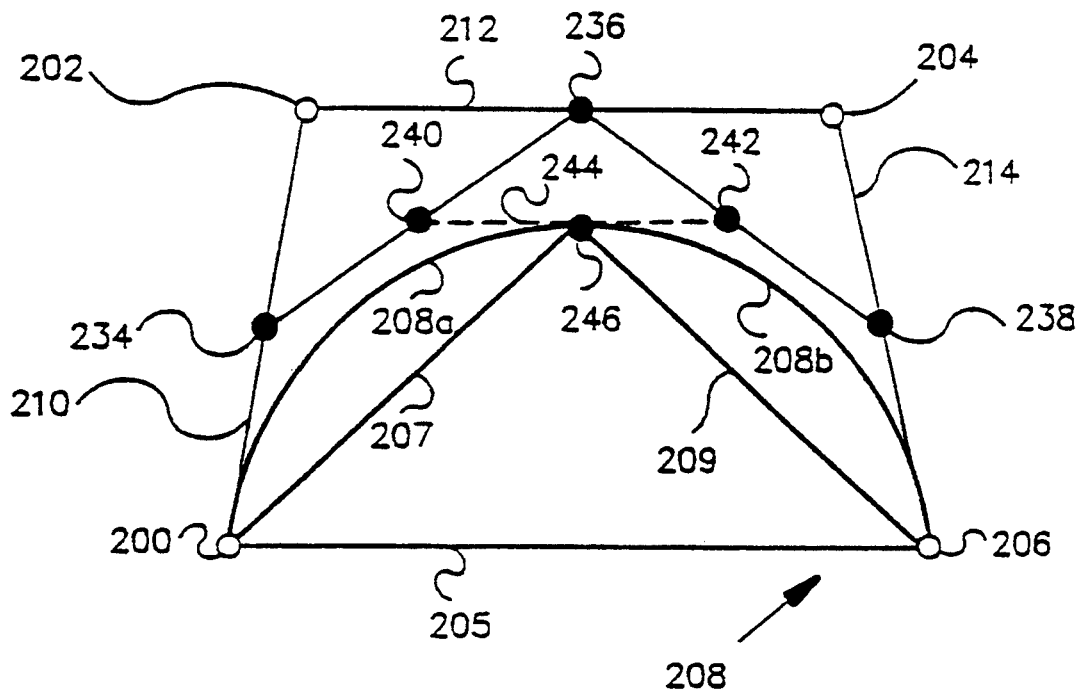
FIG. 8 illustrates the technique used to subdivide the Bézier curve of FIG. 6 if the rendered curve is not sufficiently accurate.

If the line segment 205 between the Bézier control points 200 and 206 does not adequately approximate the Bézier curve 208, the Bézier curve is subdivided, as shown in FIG. 8, and the process is repeated as many times as necessary until the curve is sufficiently approximated by a set of line segments. In FIG. 8, if the rendered Bézier curve is not sufficiently accurate, the curve 208 is subdivided according to the known principles of the prior art. The midpoints of the three line segments drawn between the four control points 200, 202, 204 and 206 are determined, those points being points 234, 236 and 238, respectively. Next, the midpoints of the line segments drawn between points 234 and 236 and between points 236 and 238 are determined, these being points 240 and 242, respectively. Finally, the midpoint of a line segment 244 drawn between the points 240 and 242 is determined, that point being point 246. The arc 208 passes through point 246. At point 246, the arc 208 is tangent to the line segment 244 connecting points 240 and 242. Thus, curve 208 has been divided into two arcuate portions, arc 208a and arc 208b, each of which is defined by four Bézier control points. Arc 208a is defined by control points 200, 234, 240 and 246, while arc 208b is defined by control points 246, 242, 238 and 206. A line segment 207 drawn between Bézier end points 200 and 246 is tested by the same technique described above to determine if the line segment 207 is a sufficiently accurate approximation of arc 208a. Similarly, line segment 209 is tested as an approximation of arc 208b. The Bézier curve is rendered using principles of the present invention independently for each of the arcs 208a and 208b until the rendered Bézier curve is a satisfactory approximation for display purposes using the test magnitude selected.

The system and method of the present invention utilize the prior art technique of subdividing a Bézier curve to render the curve. However, the present invention uses a dramatically different approach in analyzing the amount of error in the rendered curve. The vector approach of the present invention to accomplish error analysis greatly increases the speed at which the graphic system 100 can render a Bézier curve. Furthermore, the system and method of the present invention will only subdivide a Bézier curve as often as required to render the curve to within the accuracy of the particular display device being used.

Figure 9:
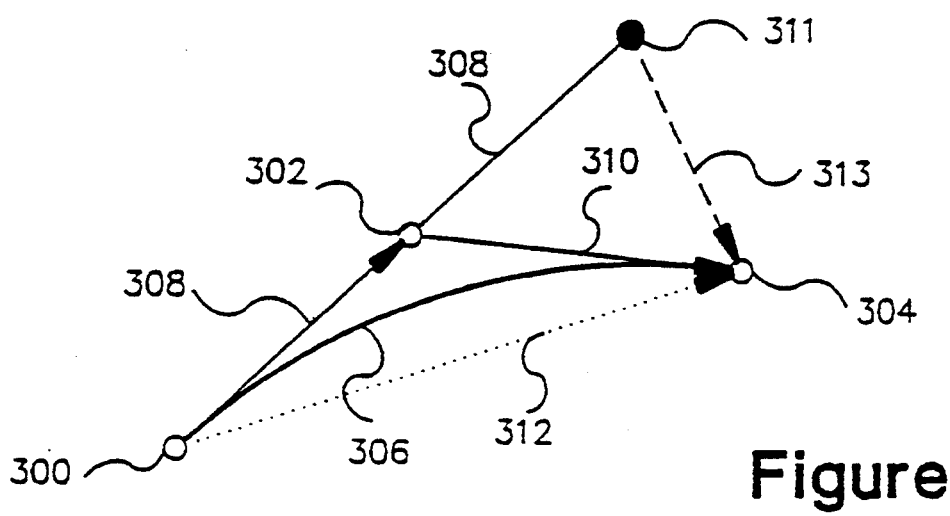
FIG. 9 illustrates a second order Bézier curve and the inventive method for determining the accuracy of the rendered curve.

It should also be noted that the same vector error analysis may be utilized with Bézier curves of any order. For example, the most simple Bézier curve is a second order Bézier curve, shown in FIG. 9, which is defined by only three control points. Control points 300, 302 and 304 define the Bézier curve 306 and define the endpoints for the line segment 312 extending between the Bézier end points 300 and 304 that is used to approximate the curve 306. In a second order Bézier curve, the present invention uses only a single error vector to determine the accuracy of the rendered curve. In a manner similar to the technique for a cubic Bézier curve, a first construction vector 308 is defined using the magnitude and direction from control point 300 to control point 302. A second construction vector 310 is defined using the magnitude and direction from control point 302 to control point 304. The first construction vector 308 is relocated with its tail at control point 302, thus creating vector 308' with its tip terminating at a point 311. An error vector 313 is defined with a magnitude and direction extending from the point 311 to the control point 304. The error vector 313 is defined mathematically by vector subtraction of the vector 308' (or in reality, the first construction vector 308) from the second construction vector 310. As before, error vector 313 can be defined in terms of vectors extending from an origin of the display screen that does not coincide with the control point 300.

Figure 10:
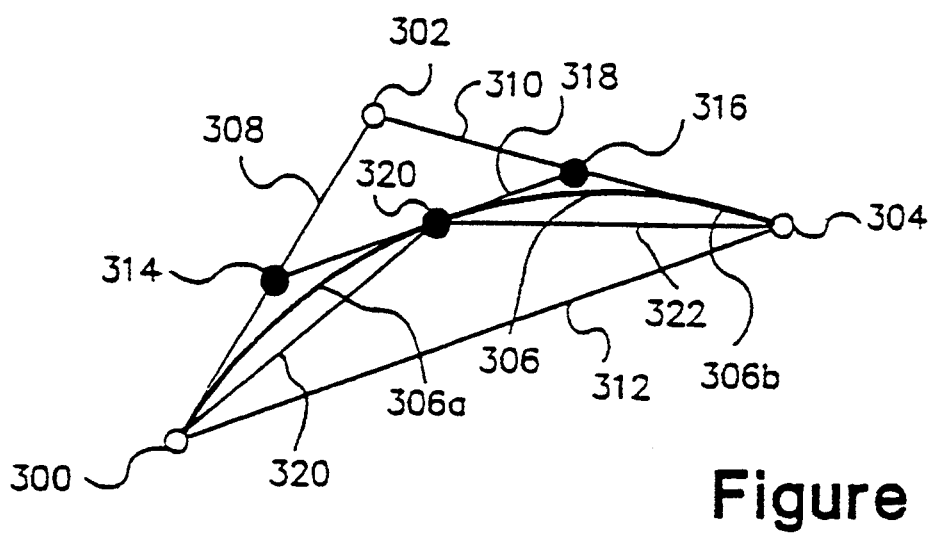
FIG. 10 illustrates the process of subdividing the second order Bézier curve of FIG. 9 if the rendered curve is not sufficiently accurate.

According to the principles of the present invention, it is not necessary to actually calculate the magnitude of the error vector 313. As described above, the larger of the X or Y rectangular component of error vector 313 is compared to the test magnitude to determine the accuracy of the rendered curve. If the larger of the X or Y component of error vector 313 exceeds the test magnitude, the Bézier curve 306 is subdivided according to the prior art procedure described above as shown in FIG. 10. First, the midpoints on the two line segments drawn between control points 300, 302 and 304 are determined, those points being points 314 and 316, respectively. Next, a line segment 318 is drawn between points 314 and 316. Finally, the midpoint of the line segment 318 is determined, that point being point 320. The arc 306 passes through point 320. At point 320, the arc 306 is tangent to the line segment 318 connecting points 314 and 316. Thus, the curve 306 has been subdivided into two arcuate portions, arc 306a and arc 306b, each of which is defined by three Bézier control points. Arc 306a is defined by control points 300, 314 and 320, while arc 306b is defined by control points 320, 316 and 304. Line segments 320 and 322 are seperately tested to determine if they are sufficiently accurate to be used as approximations of arcs 306a and 306b, respectively. The Bézier curve is rendered using principles of the present invention independently for each of the arcs 306a and 306b until the rendered spline for the curve 306 is a satisfactory approximation for display purposes using the test magnitude selected.

As previously discussed, it is clear that one could use as an error criterion, any function of the error vectors that becomes small if and only if all $N-1$ error vectors in an Nth order Bézier curve become small. For example, instead of the magnitude of the error vectors, one could look at the magnitude of any $N-1$ linearly independent combinations of the $N-1$ error vectors.

Figure 11:
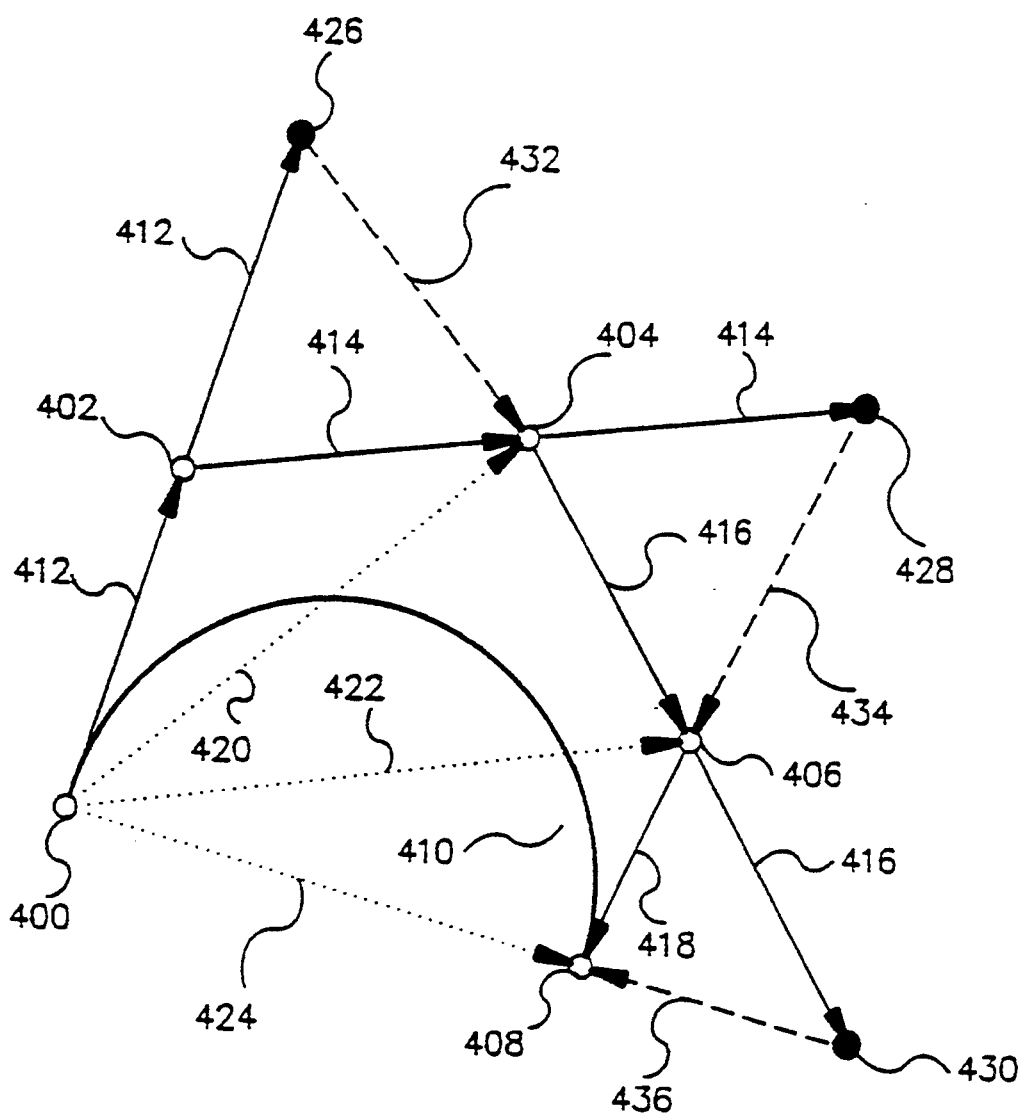
FIG. 11 illustrates the inventive method for determining the accuracy, of a fourth order Bézier curve.

Similarly, the present invention will work with higher order Bézier curves, with the only difference being the number of error vectors that must be compared to the test magnitude. FIG. 11 shows a fourth order Bézier curve 410, which is defined by five control points 400, 402, 404, 406 and 408, respectively. A fourth order Bézier curve, rendered according to the principles of the present invention, will have three error vectors. According to the principles of the present invention, construction vectors 412, 414, 416 and 418 are formed between the five control points. Assuming that control point 400 is chosen as the origin for the screen display, three additional vectors 420, 422 and 424 are shown with their tails located at the origin 400 and their tips located at Bézier control points 404, 406 and 408, respectively. As previously discussed, the error vectors can be determined using either set of vectors.

In the same manner described before, using a graphical solution for purposes of illustration, vector 412 is relocated with its tail coincident with control point 402, thus creating a vector 412'. The tip of vector 412' terminates at a point 426. A first error vector 432 is defined with a magnitude and direction extending from point 426 to the control point 404. Similarly, vectors 414 and 416 are relocated with their tails coincident with control points 404 and 406, respectively, thus creating vectors 414' and 416'. The tips of these vectors 414' and 416' terminate at the points 428 and 430, respectively. A second error vector 434 is defined with a magnitude and direction extending from between point 428 to the control point 406. Likewise, a third error vector 436 is defined with a magnitude and direction extending from point 430 to the control point 408.

Again, it should be noted that the first error vector 432 is defined mathematically by subtracting the first construction vector 412 from the second construction vector 414; the second error vector 434 is defined mathematically by subtracting the second construction vector 414 from the third construction vector 416; and the third error vector 436 is defined mathematically by subtracting the third construction vector 416 from the fourth construction vector 418. The same general process is used for any order of Bézier curve. As before, each of the error vectors 432, 434 and 436 can be defined in terms of vectors drawn between an origin, shown in FIG. 11 as control point 400, or any other point.

While different orders of Bézier curve have different number of error vectors (a cubic Bézier curve has two error vectors, a fourth order Bézier curve has three error vectors), the process of error vector calculation and subdivision of the Bézier curve is continued until the magnitude of each error vector is less than the test magnitude. As previously discussed, the present invention does not require a determination of the actual magnitude of error vectors 432, 434 and 426. It is only necessary to determine that the larger of the X or Y component for each error vector is less than the test magnitude. If all three values for the error vectors are less than the test magnitude, then the rendered curve is deemed to be a sufficient approximation for display purposes.

If any of the X or Y components of the error vectors exceed the value of the test magnitude, the Bézier curve is subdivided according to the well known technique of the prior art so as to provide an even closer fit to the Bézier curve 410. The first subdivision of the curve 410 will be divided into two arcs, each of which is defined by five control points. The error vector calculation is then performed independently for each of the two arcs. The process of subdivision and error vector calculation is repeated as many times as necessary until the magnitude for each of the error vectors for a given arc is less than the test magnitude. The present invention can operate on Bézier curves of any order, the only difference being the number of error vectors generated in the process. It should be noted that the inventive process may be used on any order of Bézier curve starting at either end of the Bézier curve.

Figure 3:
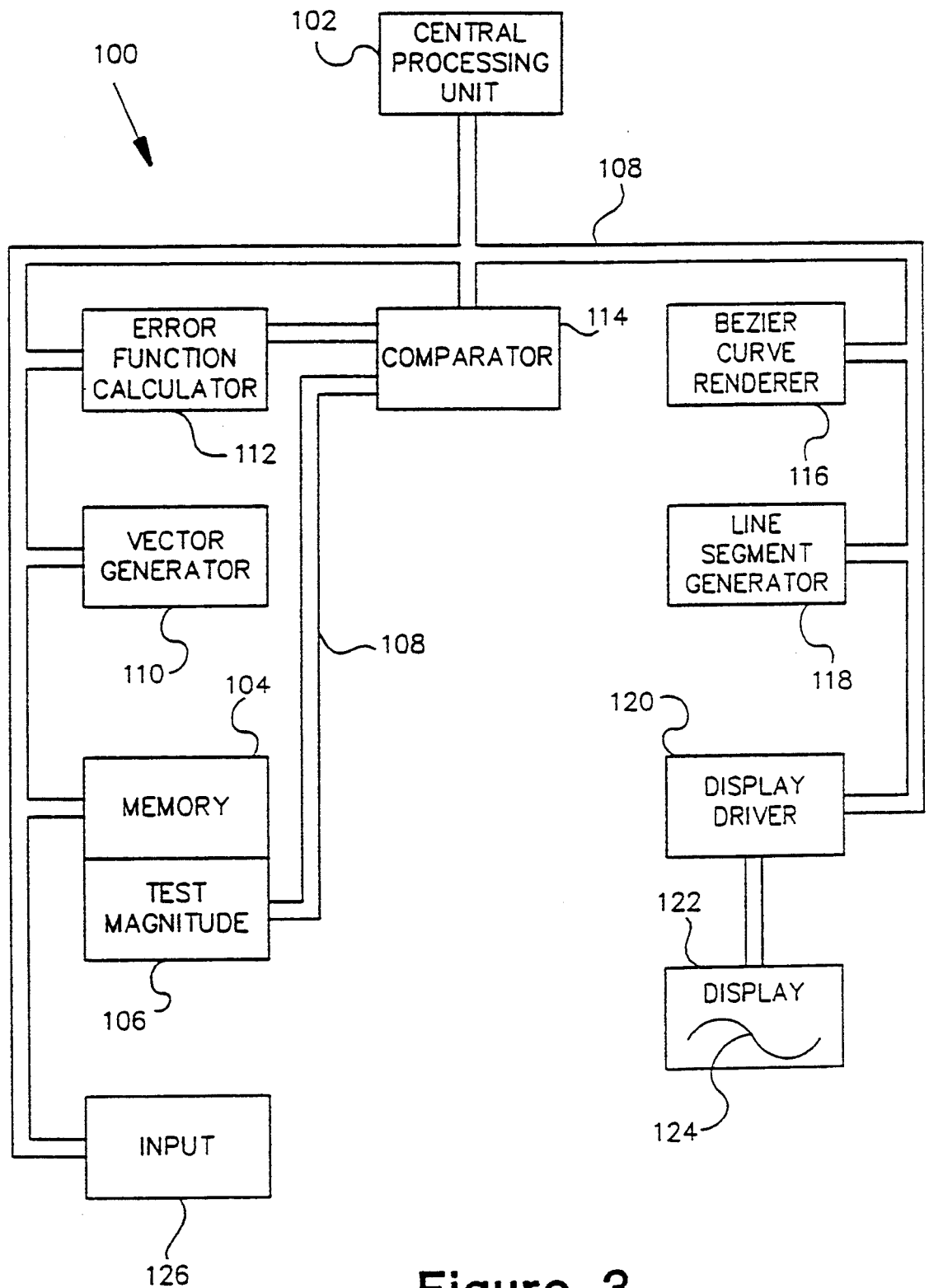
FIG. 3 is a block diagram of the preferred apparatus for practicing embodiments of the present invention.

The preferred apparatus for implementing the invention is illustrated in FIG. 3, which shows a simplified block diagram of the computer graphics system 100. The graphics system 100 includes a central processing unit (CPU) 102, and a memory 104 which stores digital values representing the control points of a Bézier curve that is to be displayed as well as the value of the selected test magnitude 106. As directed by the CPU 102, which is connected to other elements of the system via a bus 108, the data within the memory is transferred, via bus 108, to a Bézier curve renderer 116. The Bézier curve renderer converts the Bézier end points into a set of line segments, each defined by two points, that approximates the curve defined by the Bézier control points to a degree controlled by the test magnitude 106. The vector generator 110 defines the construction vectors and vectors from an origin to the Bézier control points. An error function calculator 112 calculates the error vectors by subtracting construction vectors or vectors from the origin to the Bézier control points as previously discussed. Alternatively, the error function calculator 112 may calculate functions of the error vectors as an indicia of accuracy instead of the error vectors themselves. The comparator 114 determines whether the magnitude of an error function, an error vector, or an error vector component, is less than the test magnitude. If all error magnitudes are less than the test magnitude, the line segment drawn between the Bézier end points may be used to approximate the Bézier curve. In that event, the Bézier curve renderer 116 applies the two points which define the line segment to a line segment generator 118, which converts the two points into a plurality of data values corresponding to the line segment. The data values are processed by the display driver 120 and applied to a graphic display 122, such as a CRT, a laser printer, or the like, which displays a graphic image 124, which is a visual representation of the curve defined by the Bézier control points in the memory 104. If the comparator 114 indicates that any one of the error magnitudes exceeds the test magnitudes 106, the curve is subdivided into two portions according to principles well known in the art. The system then operates independently on the two portions of the curve by the process described above.

The Bézier control points stored in the memory 104 may be obtained from a wide variety of sources such as a conventional application software package, a digitizing unit, or the like. All of these sources are generically represented by input block 126.

The present invention may be used on Bézier curves of two or more dimensions. A three dimensional Bézier surface is defined by two independent orthogonal Bézier curves. By applying the principles of the present invention independently to each Bézier curve, a three dimensional Bézier surface may be easily rendered.

It is to be understood that even though numerous embodiments and advantages of the present invention have been set forth in the foregoing description, the above disclosure is illustrative only, and changes may be made in detail yet remain within the broad principles of the present invention. Therefore, the present invention is to be limited only by the appended claims.

I claim:

1. A method of generating a straight line segment to approximate a Bézier curve defined by first, second, third and fourth sequential Bézier control points, the method comprising the steps of:

(a) selecting a test magnitude indicative of a desired degree of accuracy with which the line segment should approximate the Bézier curve;

(b) determining first, second, and third construction vectors based on the first, second, third, and fourth Bézier control points, said first construction vector having a magnitude defined by the distance between the first and second Bézier control points and a direction in the direction from the first to the second Bézier control points said second construction vector having a magnitude defined by the distance between the second and third Bézier control points and a direction in the direction from the second to the third Bézier control points; said third construction vector having a magnitude defined by the distance between the third and fourth Bézier control points and a direction in the direction from the third to the fourth Bézier control points;

(c) determining a first error vector having a magnitude and direction defined by subtracting said first construction vector from said second construction vector;

(d) determining a second error vector having a magnitude and direction defined by subtracting said second construction vector from said third construction vector;

(e) comparing the magnitude of said first error vector with said test magnitude, and indicating if the magnitude of said first error vector exceeds said test magnitude or if the magnitude of said first error vector is less than said test magnitude;

(f) comparing the magnitude of said second error vector with said test magnitude, and indicating if the magnitude of said second error vector exceeds said test magnitude or if the magnitude of said second error vector is less than said test magnitude;

(g) generating an indicator signal indicating that the magnitudes of both said first and second error vectors are less than said test magnitude; and (h) generating the straight line segment between the first and fourth Bézier control points upon receiving said indicator signal 2. The method of claim 1, further including the steps of subdividing the Bézier curve to generate a second set of first, second, third, and fourth sequential Bézier control points representative of a portion of the curve if the magnitude of either of said first and second error vectors exceeds said test magnitude, and repeating steps b–h using said second set of Bézier control points.

3. The method according to claim 1 wherein the steps (e)-(h) of comparing the magnitudes of said first and second error vectors with said test magnitude, generating said indicator signal, and generating the straight line segment includes the steps of:

determining the magnitudes of the resolved vector components of said first error vector:

determining the magnitudes of the resolved vector components of said second error vector:

comparing the magnitudes of said resolved vector components of said first error vector with said test magnitude:

comparing the magnitudes of said resolved vector components of said second error vector with said test magnitude;

generating said indicator signal if the magnitudes of said resolved vector components of said first and second error vectors are all less than said test magnitude; and generating the straight line segment between the first and fourth Bézier control points to approximate the Bézier curve.

4. The method according to claim 1 wherein the steps (e)-(h) of comparing the magnitudes of said first and second error vectors with said test magnitude, generating said indicator signal, and generating the straight line segment includes the steps of:

determining and selecting the vector component of said first error vector with the largest magnitude;

determining and selecting the vector component of said second error vector with the largest magnitude:

comparing the magnitude of said selected vector component of said first error vector with said test magnitude:

comparing the magnitude of said selected vector component of said second error vector with said test magnitude;

generating said indicator signal if the magnitudes said selected vector component of said first error vector and said selected vector component of said second error vector are both less than said test magnitude; and generating the straight line segment between the first and fourth Bézier control points to approximate the Bézier curve.

5. A method of generating a straight line segment to approximate a Bézier curve defined by first, second, third and fourth sequential Bézier control points, the method comprising the steps of:

(a) selecting a test magnitude indicative of a desired degree of accuracy with which the line segment should approximate the Bézier curve;

(b) determining first, second, and third construction vectors, said first construction vector having a magnitude defined by the distance between the first and second Bézier control points and a direction in the direction from the first to the second Bézier control points, said second construction vector having a magnitude defined by the distance between the second and third Bézier control points and a direction in the direction from the second to the third Bézier control points, said third construction vector having a magnitude defined by the distance between the third and fourth Bézier control points and a direction in the direction from the third to the fourth Bézier control points;

(c) determining first and second error functions from a first error vector having a magnitude and direction defined by subtracting said first construction vector from said second construction vector, and a second error vector having a magnitude and direction defined by subtracting said second construction vector from said third construction vector;

(d) comparing the magnitude of said first error function with said test magnitude, and indicating if the magnitude of said first error function exceeds said test magnitude or if the magnitude of said first error function is less than said test magnitude;

(e) comparing the magnitude of said second error function with said test magnitude, and indicating if the magnitude of said second error function exceeds said test magnitude or if the magnitude of said second error function is less than said test magnitude; and (f) generating the straight line segment between the first and fourth Bézier control points if said steps of comparing indicate that the magnitudes of both said first and second error functions are less than said test magnitude 6. A method of generating a straight line segment to approximate a Bézier curve defined by a variable number, N, of sequential Bézier control points, $P_1 \ldots P_N$ where N is an integer greater than two, the method comprising the steps of:

(a) selecting a test magnitude indicative of a desired degree of accuracy with which the line segment should approximate the Bézier curve;

(b) determining a set of $N-1$ construction vectors, $V_1 \ldots V_{N-1}$, beginning at a Bézier control point, $P_1$, each of said construction vectors being defined by sequential pairs, $P_A$ and $P_{A+1}$, of the Bézier control points, $P_1 \ldots P_N$, each said construction vector $V_A$ having a magnitude defined by the distance between a sequential pair of Bézier control points $P_A$ and $P_{A+1}$ and a direction from Bézier control point $P_A$ to Bézier control point $P_{A+1}$, where A is an integer that varies from one to $N-1$;

(c) determining a set of $N-2$ error vectors, $E_1 \ldots E_{N-2}$, each said error vector $E_B$ having a magnitude and direction defined by subtracting said construction vector $V_B$ from said construction vector $V_{B+1}$, where B is an integer that varies from one to $N-2$;

(d) comparing the magnitudes of each of said $N-2$ error vectors with said test magnitude and indicating that the magnitudes of each of said error vectors are less than said test magnitude; and (e) generating the straight line segment between the Bézier control points $P_1$ and $P_N$ if said step of comparing indicates that the magnitudes of each of said error vectors are less than said test magnitude.

7. The method of claim 6 wherein if the magnitude of any of the $N-2$ error vectors is larger than said test magnitude, then subdividing the Bézier curve to generate a second set of N sequential Bézier control points representative of a portion of the curve, and repeating steps b–e using said second set of Bézier control points.

8. The method according to claim 6 wherein the step d of comparing the magnitudes of said $N-2$ error vectors with said test magnitude includes the steps of:

determining the magnitudes of resolved vector components of each of said $N-2$ error vectors;

comparing the magnitudes of said resolved vector components of said $N-2$ error vectors with said test magnitude; and indicating if the magnitudes of said resolved vector components of said $N-2$ error vectors are all less said test magnitude.

9. The method according to claim 6 wherein the step d of comparing the magnitudes of said $N-2$ error vectors with said test magnitude includes the steps of:

determining and selecting a vector component with the largest magnitude for each of said $N-2$ error vectors;

comparing the magnitude of said selected vector component of each of said $N-2$ error vectors with said test magnitude; and indicating if the magnitudes of said selected component for each of said $N-2$ error vectors is less than said test magnitude.

10. A method of generating a straight line segment to approximate a Bézier curve defined by a variable number, N, of sequential Bézier control points, $P_1 \ldots P_N$ where N is an integer greater than two, the method comprising the steps of:

(a) selecting a test magnitude indicative of a desired degree of accuracy with which the line segment should approximate the Bézier curve;

(b) determining a set of $N-1$ construction vectors, $V_1 \ldots V_{N-1}$, beginning at a Bézier control point, $P_1$, each of said construction vectors being defined by sequential pairs, $P_A$ and $P_{A+1}$, of the Bézier control points, $P_1 \ldots P_N$, each said construction vector $V_A$ having a magnitude defined by the distance between a sequential pair of Bézier control points $P_A$ and $P_{A+1}$ and a direction from Bézier control point $P_A$ to Bézier control point $P_{A+1}$, where A is an integer that varies from one to $N-1$:

(c) determining a set of $N-2$ error functions $F_1 \ldots F_{N-2}$ from a set of $N-2$ error vectors, $E_l \ldots E_{N-2}$, each said error vector $E_B$ having a magnitude and direction defined by subtracting said construction vector $V_B$ from said construction vector $V_{B+1}$, where B is an integer that varies from one to $N-2$;

(d) comparing the magnitudes of each of said $N-2$ error functions with said test magnitude and indicating if the magnitudes of each of said error functions are less than said test magnitude;

(e) generating the straight line segment between the Bézier control points $P_1$ and $P_N$ if said step of comparing indicates that the magnitudes of each of said error functions are less than said test magnitude.

11. A method of generating a straight line segment to approximate a Bézier curve defined by a variable number, N, of sequential Bézier control points, $P_1 \ldots P_N$ where N is an integer greater than two and Bézier control points $P_1$ and $P_N$ are end points that coincide with the Bézier curve, the method comprising the steps of:

(a) selecting a test magnitude indicative of a desired degree of accuracy with which the line segment should approximate the Bézier curve;

(b) determining a set of $N-1$ construction vectors, $V_1 \ldots V_{N-1}$, beginning at a Bézier control point, $P_1$, each of said construction vectors being defined by sequential pairs, $P_A$ and $P_{A+1}$, of the Bézier control points, $P_1 \ldots P_N$, each said construction vector $V_A$ having a magnitude defined by the distance between a sequential pair of Bézier control points $P_A$ and $P_{A+1}$ and a direction from Bézier control point $P_A$ to Bézier control point $P_{A+1}$, where A is an integer that varies from one to $N-1$;

(c) determining a set of $N-2$ error vectors, $E_l \ldots E_{N-2}$, each said error vector $E_B$ having a magnitude and direction defined by subtracting said construction vector $V_B$ from said construction vector $V_{B+1}$, where B is an integer that varies from one to $N-2$;

(d) comparing the magnitudes of each of said $N-2$ error vectors with said test magnitude and indicating if the magnitudes of each of said error vectors are less than said test magnitude;

(e) if the magnitude of any of said $N-2$ error vectors is greater than said test magnitude, subdividing the Bézier curve into two individual arcs, defining each of said arcs by an additional set of N Bézier control points, $N-1$ of which are calculated by the subdivision, with one end point of said additional set being either Bézier control point $P_1$ or $P_N$ of the prior set of Bézier control points; and (f) repeating steps b-e on each said individual arcs until said step of comparing indicates that the magnitude of each of said error vectors is less than said test magnitude, and generating the straight line segment between Bézier control points $P_1$ and $P_N$ of said individual arcs.

12. The method according to claim 11 wherein the step d of comparing the magnitudes of said $N-2$ error vectors with said test magnitude includes the steps of:

determining the magnitudes of type resolved vector components of each of said $N-2$ error vectors;

comparing the magnitudes of said resolved vector components of said $N-2$ error vectors with said test magnitude; and indicating if the magnitudes of said resolved vector components of said $N-2$ error vectors are all less said test magnitudes.

13. The method according to claim 11 wherein the step d of comparing the magnitudes of said $N-2$ error vectors with said test magnitude includes the steps of:

determining and selecting a vector component with the largest magnitude for each of said $N-2$ error vectors;

comparing the magnitude of said selected component of each of said $N-2$ error vectors with said test magnitude; and indicating if the magnitudes of said selected component for each of said $N-2$ error vectors is less than the magnitude of said test magnitude.

14. A system for generating a straight line segment to approximate a Bézier curve defined by first, second, third, and fourth sequential Bézier control points, the system comprising:

(a) means for selecting a test magnitude indicative of a desired degree of accuracy which the line segment should approximate the Bézier curve;

(b) means for determining first, second, and third construction vectors, said first construction vector having a magnitude defined by the distance between the first and second Bézier control points and a direction in the direction from the first to the second Bézier control points, said second construction vector having a magnitude defined by the distance between the second and third Bézier control points and a direction in the direction from the second to the third Bézier control points, said third construction having a magnitude defined by the distance between the third and fourth Bézier control points and a direction in the direction from the third to the fourth Bézier control points;

(c) means for determining first and second error vectors, said first error vector having a magnitude and direction defined by subtracting said first construction vector from said second construction vector, said second error vector having a magnitude and direction defined by subtracting said second construction vector from said third construction vector;

(d) means for comparing the magnitudes of said first and second error vectors with said test magnitude, and indicating if the magnitude of either said first or said second error vector exceeds said test magnitude or if the magnitudes of both said first and said second error vectors are less than said test magnitude; and (e) means responsive to said comparing means for generating the line segment between the first and fourth Bézier control points to approximate the Bézier curve if said comparing means indicates that the magnitude of both said first and second error vectors are less than said test magnitude.

15. The system of claim 14, further including means for subdividing the Bézier curve to generate a second set of first, second, third, and fourth sequential Bézier control points, representative of a portion of the curve, and providing said second set of control points for processing by elements b-c if said comparing means indicates that the magnitude of either said first or second error vector exceeds said test magnitude.

16. The system according to claim 14 wherein said means for comparing the magnitudes of said first and second error vectors with said test magnitude includes:
means for resolving the vector components of said first and said second error vectors; and
means for comparing the magnitudes of said resolved vector components of said first and second error vectors with said test magnitude, and indicating if the magnitude of any of said resolved vector components of said first or said second error vector exceeds said test magnitude if the magnitudes of all of said resolved vector components of said first and second error vectors are less than said test magnitude.

17. The system of claim 16, further including means for subdividing the Bézier curve to generate a second set of first, second, third, and fourth sequential Bézier control points, representative of a portion of the curve, and providing said second set of control points for processing by elements b-c if said comparing means indicates that the magnitudes of any of said resolved vector components of said first or second error vector exceed said test magnitude.

18. The system according to claim 14 wherein said means for comparing the magnitudes of said first and second error vectors with said test magnitude includes:
means for determining and selecting vector components with the largest magnitude for said first and said second error vectors; and
means for comparing the magnitudes of said selected vector component of said first and second error vectors with said test magnitude, and indicating if the magnitude of said selected vector component of either said first or said second error vector exceeds said test magnitude or if the magnitudes of both of said selected vector components are less than said test magnitude.

19. The system of claim 18, further including means for subdividing the Bézier curve to generate a second set of first, second, third, and fourth sequential Bézier control points, representative of a portion of the curve, and providing said second set of control points for processing by elements b-c if said comparing means indicates that the magnitude of said selected vector component of either said first or second error vector exceeds said test magnitude.

20. A system for generating a straight line segment to approximate a Bézier curve defined by first, second, third, and fourth sequential Bézier control points, the system comprising:

(a) means for selecting a test magnitude indicative of a desired degree of accuracy which the line segment should approximate the Bézier curve;

(b) means for determining first, second, and third construction vectors, said first construction vector having a magnitude defined by the distance between the first and second Bézier control points and a direction in the direction from the first to the second Bézier control points, said second construction vector having a magnitude defined by the distance between the second and third Bézier control points and a direction in the direction from the second to the third Bézier control points, said third construction having a magnitude defined by the distance between the third and fourth Bézier control points and a direction in the direction from the third to the fourth Bézier control points;

(c) means for determining first and second error functions based on first and second error vectors, said first error vector having a magnitude and direction defined by subtracting said first construction vector from said second construction vector, said second error vector having a magnitude and direction defined by subtracting said second construction vector from said third construction vector;

(d) means for comparing the magnitudes of said first and second error functions with said test magnitude, and indicating if the magnitude of either said first or said second error function exceeds said test magnitude or if the magnitudes of both said first and said second error functions are less than said test magnitude; and (e) means, responsive to said comparing means, for generating the line segment between the first and fourth Bézier control points to approximate the Bézier curve if said comparing means indicates that the magnitude of both said first and second error functions are less than said test magnitude.

21. A system for of generating a straight line segment to approximate a Bézier curve defined by a variable number, N, of sequential Bézier control points, $P_1 \ldots P_N$ where N is an integer greater than two, the system comprising:

(a) means for selecting a test magnitude indicative of a desired degree of accuracy with which the line segment should approximate the curve;

(b) means for determining a set of $N-1$ construction vectors, $V_1 \ldots V_{N-1}$, beginning at a Bézier control point, $P_1$, each of said construction vectors being defined by sequential pairs, $P_A$ and $P_{A+1}$, of the Bézier control points, $P_1 \ldots P_N$, each said construction vectors $V_A$ having a magnitude defined by the distance between a sequential pair of Bézier control points $P_A$ and $P_{A+1}$ and a direction from Bézier control point $P_A$ to Bézier control point $P_{A+1}$, where A is an integer that varies from one to $N-1$;

(c) means for determining a set of $N-2$ error vectors, $E_1 \ldots E_{N-2}$, each said error vector $E_B$ having a magnitude and direction defined by subtracting said construction vector $V_B$ from said construction vector $V_{B+1}$, where B is an integer that varies from one to $N-2$;

(d) means for comparing the magnitudes of each of said $N-2$ error vectors with said test magnitude, indicating if the magnitude of any of said $N-2$ error vectors exceeds said test magnitude, and generating an indicator signal if the magnitude of each of said $N-2$ error vectors is less than said test magnitude; and (e) means, responsive to said comparing means, for generating the line segment between Bézier control points $P_1$ and $P_N$ to approximate the Bézier curve if said comparing means indicates that the magnitudes of each of said $N-2$ error vectors are less than said test magnitude.

22. The system of claim 21, further including means for subdividing the Bézier curve to generate a second set of N sequential Bézier control points representative of a portion of the curve, and providing said second set of control points for processing by elements b-c if said comparing means indicates that the magnitude of any of said $N-2$ error vectors exceeds said test magnitude.

23. The system according to claim 21 wherein said means for comparing the magnitudes of said $N-2$ error vectors with said test magnitude includes:

means for resolving vector components of said $N-2$ error vectors; and means for comparing the magnitudes of said resolved components of said $N-2$ error vectors with said test magnitude, and indicating if the magnitude of any of said resolved vector components of said $N-2$ error vectors exceeds said test magnitude or if the magnitudes of all of said resolved vector components of said $N-2$ error vectors are less than said test magnitude.

24. The system of claim 23, further including means for subdividing the Bézier curve to generate a second set of N sequential Bézier control points representative of a portion of the curve, and providing said second set of control points for processing by elements b-c if said comparing means indicates that the magnitude of any of said resolved vector components of said $N-2$ error vectors exceeds said test magnitude.

25. The system according to claim 21 wherein said means for comparing the magnitudes of said $N-2$ error vectors with said test magnitude includes:

means for determining and selecting a vector component with the largest magnitude for each of said $N-2$ error vectors; and means for comparing the magnitudes of said selected component of each of said $N-2$ error vectors with said test magnitude, and indicating if the magnitude of any of said selected vector components of said $N-2$ error vectors exceeds said test magnitude or if the magnitudes of said selected vector components of said $N-2$ error vectors are each less than said test magnitude.

26. The system of claim 25, further including means for subdividing the Bézier curve to generate a second set of N sequential Bézier control points representative of a portion of the curve, and providing said second set of control points for processing by elements b-c if said comparing means indicates that the magnitude of any of said selected vector components of said $N-2$ error vectors exceeds said test magnitude.

27. A system for of generating a straight line segment to approximate a Bézier curve defined by a variable number, N, of sequential Bézier control points, $P_1 \ldots P_N$ where N is an integer greater than two, the system comprising:

(a) means for selecting a test magnitude indicative of a desired degree of accuracy with which the line segment should approximate the curve;

(b) means for determining a set of $N-1$ construction vectors, $V_1 \ldots V_{N-1}$, beginning at a Bézier control point, $P_1$, each of said construction vectors being defined by sequential pairs, $P_A$ and $P_{A+1}$, of the Bézier control points, $P_1 \ldots P_N$, each said construction vectors $V_A$ having a magnitude defined by the distance between a sequential pair of Bézier control points $P_A$ and $P_{A+1}$ and a direction from Bézier control point $P_A$ to Bézier control point $P_{A+1}$, where A is an integer that varies from one to $N-1$;

(c) means for determining a set of $N=2$ error functions based on $N-2$ error vectors, $E_1 \ldots E_{N-2}$, each said error vector $E_B$ having a magnitude and direction defined by subtracting said construction vector $V_B$ from said construction vector $V_{B+1}$, where B is an integer that varies from one to $N-2$;

(d) means for comparing the magnitudes of each of said $N-2$ error functions with said test magnitude, and indicating if the magnitude of any of said $N-2$ error functions exceeds said test magnitude or if the magnitude of each of said $N-2$ error functions is less than said test magnitude; and (e) means, responsive to said comparing means, for generating the line segment between Bézier control points $P_1$ and $P_N$ to approximate the Bézier curve if said comparing means indicates that the magnitudes of each of said $N-2$ error functions are less than said test magnitude.

28. A system for of generating a straight line segment to approximate a Bézier curve defined by a variable number, N, of sequential Bézier control points, $P_1 \ldots P_N$ where N is an integer greater than two and Bézier control points $P_1$ and $P_N$ are end points that coincide with the Bézier curve, the system comprising:

(a) means for selecting a test magnitude indicative of the degree of accuracy with which the line segment should approximate the curve;

(b) means for determining a set of $N-1$ construction vectors, $V_1 \ldots V_{N-1}$, beginning at a Bézier control point, $P_1$, each of said construction vectors being defined by sequential pairs, $P_A$ and $P_{A+1}$, of the Bézier control points, $P_1 \ldots P_N$, each said construction vector $V_A$ having a magnitude defined by the distance between a sequential pair of Bézier control points $P_A$ and $P_{A+1}$ and a direction from Bézier control point $P_A$ to Bézier control points $P_{A+1}$, where A varies is an integer that from one to $N-1$;

(c) means for determining a set of $N-2$ error vectors, $E_1 \ldots E_{N-2}$, each said error vector $E_B$ having a magnitude and direction defined by subtracting said construction vector $V_B$ from said construction vector $V_{B+1}$, where B is an integer that varies from one to N−2;

(d) means for comparing the magnitudes of each of said N−2 error vectors with said test magnitude, and indicating if the magnitude of any of said N−2 error vectors exceeds said test magnitude or if the magnitudes of said N−2 vectors are each less than the magnitude of said test magnitude;

(e) means, responsive to said comparing means, for generating the line segment between the Bézier control points $P_1$ and $P_N$ to approximate the Bézier curve if said comparing means indicates that the magnitude of said N−2 error vectors are each less than the magnitude of said test magnitude; and (f) means for subdividing the Bézier curve into two individual arcs if said comparing means indicates that the magnitude of any of said N−2 error vectors exceeds said test magnitude, generating an additional set of N sequential Bézier control points for each of said individual arcs, N−1 of which are calculated by said means for subdividing, with one end point for said additional sets being either Bézier control point $P_1$ or $P_N$ of the prior set of Bézier control points, and providing said additional sets of Bézier control points for processing by elements b-d until said comparing means indicates that the magnitude of said N−2 error vectors are each less than said test magnitude.

29. The system according to claim 28 wherein said means for comparing the magnitudes of said N−2 error vectors with said test magnitude includes:

means for resolving vector components of said N−2 error vectors; and means for comparing the magnitudes of said resolved components of said N−2 error vectors with said test magnitude, and indicating if the magnitude of any of said resolved vector components of said N−2 error vectors exceeds said test magnitude or if the magnitude of all of said resolved vector components of said N−2 error vectors are less than said test magnitude.

30. The system according to claim 28 wherein said means for comparing the magnitudes of said N−2 error vectors with said test magnitude includes:

means for determining and selecting a vector component with the largest magnitude for each of said N−2 error vectors; and means for comparing the magnitudes of said selected component of each of said N−2 error vectors with said test magnitude, and indicating if the magnitude of any of said selected vector components of said N−2 error vectors exceeds said test magnitude or if the magnitudes of said selected vector components of said N−2 error vectors are each less than said test magnitude.

31. A system for generating a straight line segment to approximate a Bézier curve defined by first, second, third, and fourth sequential Bézier control points using a predetermined test magnitude indicative of a desired degree of accuracy with which the line segment should approximate the Bézier curve, the system comprising:

a central processor;

a memory, connected to said central processor via a bus carrying data signals;

an input unit by which the Bézier control points may be entered into said memory via said bus;

a vector generator, coupled to said bus, to determine vectors between a selected origin and first, second, third, and fourth sequential Bézier control points, to determine first, second, and third construction vectors, said first construction vector having a magnitude defined by the distance between first and second Bézier control points and a direction in the direction from the first to the second Bézier control point, said second construction vector having a magnitude defined by the distance between second and third Bézier control points and a direction in the direction from the second to the third Bézier control point, said third construction vector having a magnitude defined by the distance between third and fourth Bézier control points and a direction in the direction from the third to the fourth Bézier control point, and to determine first and second error vectors, said first error vector having a magnitude and direction defined by subtracting said first construction vector from said second construction vector, said second error vector having a magnitude and direction defined by subtracting said second construction vector from said third construction vector;

a comparator comparing the value of the test magnitude with the value of the magnitude of said first and second error vectors and indicating if the magnitude of either said first or said second error vector exceeds the test magnitude or if the magnitudes of both said first and said second error vectors are less than the test magnitude;

a line segment generator receiving the first and fourth Bézier control points and, upon indication from said comparator that the magnitudes of both said first and said second error vectors are less than the test magnitude, generating a plurality of data values corresponding to pixels to generate the line segment between the first and Bézier control points;

a display driver receiving said plurality of data points and converting said data points into a display format; and a display receiving said converted data points and generating an image corresponding to the line segment drawn between first and fourth Bézier control points to approximate the Bézier curve.

32. The system of claim 31, further including a Bézier curve renderer to subdivide the Bézier curve to generate a second set of first, second, third, and fourth sequential Bézier control points, representative of a portion of the Bézier curve, and providing said second set of control points to said vector generator if said comparator indicates that the magnitude of either said first or said second error vector exceeds the test magnitude.

33. The system according to claim 31 wherein said comparator compares the magnitudes of resolved vector components of said first and said second error vectors with the test magnitude and indicates if the magnitude of any of the resolved vector components of said first and said second error vectors exceeds the test magnitude or if the magnitudes of the resolved vector components of said first and said second error vectors are each less than the test magnitude, and wherein said line segment generator receives the first and fourth Bézier control points and, upon indication from said comparator that the magnitudes of the resolved vector components of said first and said second error vectors are each less than the test magnitude, generating said plurality of data values.

34. The system of claim 33, further including a Bézier curve renderer to subdivide the Bézier curve to generate a second set of first, second, third, and fourth sequential Bézier control points, representative of a portion of the Bézier curve, and provide said second set of control points to said vector generator if said comparator indicates that the magnitude of the resolved vector components of either said first or said second error vector exceeds the test magnitude.

35. The system according to claim 31 wherein said comparator compares the magnitude of the largest vector component for said first and said second error vector with the test magnitude and indicates if the magnitude of the largest component of said first error vector or the magnitude of the largest component of said second error vector exceeds the test magnitude or if the magnitudes of the largest vector components are each less than the test magnitude, and wherein said line segment generator receives the first and fourth Bézier control points and, upon indication from said comparator that the magnitudes of the largest component of said first error vector or the magnitude of the largest component of said second error vector are each less than the test magnitude, generating said plurality of data values.

36. The system of claim 35, further including a Bézier curve renderer to subdivide the Bézier curve to generate a second set of first, second, third, and fourth sequential Bézier control points, representative of a portion of the Bézier curve, and provide said second set of control points to said vector generator if said comparator indicates that the magnitude of the largest component of either said first or said second error vector exceeds the test magnitude.

37. A system for generating a straight line segment to approximate a Bézier curve defined by a variable number, N, of sequential Bézier control points, $P_1 \ldots P_N$ where N is an integer greater than two, using a test magnitude indicative of a desired degree of accuracy with which the line segment should approximate the Bézier curve, the system comprised of:

a central processor;

a memory, connected to said central processor via a bus carrying data signals;

an input unit by which the N Bézier control points, $P_1 \ldots P_N$, may be entered into said memory via said bus;

a vector generator, coupled to said bus, to determine N vectors, $M_1 \ldots M_N$, between a selected origin and the N sequential Bézier control points, each of said vectors having a magnitude defined by the distance between said origin and each of the N Bézier control points, and having a direction in the direction from said origin to each of the N Bézier control points, and to determine $N-1$ construction vectors, $V_1 \ldots V_{N-1}$, beginning at Bézier control point $P_1$, each of said construction vectors being defined by sequential pairs, $P_A$ and $P_{A+1}$, of the Bézier control points, $P_1 \ldots P_N$, each of said construction vectors, $V_A$, having a magnitude defined by the distance between a pair of sequential Bézier control points $P_A$ and $P_{A+1}$ and a direction from Bézier control point $P_A$ to Bézier control point $P_{A+1}$, where A is an integer that varies from one to $N-1$, to determine a set of $N-2$ error vectors, $E_1 \ldots E_{N-2}$, each said error vector $E_B$ having a magnitude and direction defined subtracting said construction vector $V_B$ from said construction vector $V_{B+1}$, where B is an integer that varies from one to $N-2$;

a comparator comparing the value of the test magnitude with the value of the magnitudes of said $N-2$ error vectors and indicating if the magnitude of any of said $N-2$ error vectors exceed the test magnitude or if the magnitudes of each of said $N-2$ error vectors are less than the test magnitude;

a line segment generator receiving the Bézier control points $P_1$ and $P_N$ and, upon indication from said comparator that the magnitudes of each of said $N-2$ error vectors are less than the test magnitude, generating a plurality of data values corresponding to pixels to generate the line segment between the Bézier control points $P_1$ and $P_N$;

a display driver to receive said plurality of data points and convert said data points into a display format; and a display to receive said converted data points and generating an image corresponding to the line segment drawn between the Bézier control points $P_1$ and $P_N$ to approximate the Bézier curve.

38. The system of claim 37, further including Bézier curve renderer to subdivide the Bézier curve to generate a second set of N sequential Bézier control points, representative of a portion of the Bézier curve, and provide said second set of control points to said vector generator if said comparator indicates that the magnitude of any of said $N-2$ error vectors exceeds the test magnitude.

39. The system according to claim 37 wherein said comparator compares the magnitudes of resolved vector components of said $N-2$ error vectors with the test magnitude and indicates if the magnitude of any of the resolved vector components of said $N-2$ error vectors exceeds the test magnitude or if the magnitudes of the resolved vector components of said $N-2$ error vectors are each less than the test magnitude, and wherein said line segment generator receives the Bézier control points $P_1$ and $P_N$ and, upon indication from said comparator that the magnitudes of the resolved components of said $N-2$ error vectors are each less than the test magnitude, generating said plurality of data values.

40. The system of claim 37, further including a Bézier curve renderer to subdivide the Bézier curve to generate a second set of N sequential Bézier control points, representative of a portion of the Bézier curve, and providing said second set of control points to said vector generator if said comparator indicates that the magnitude of any of the resolved vector components of said $N-2$ error vectors exceeds the test magnitude.

41. The system according to claim 37 wherein said comparator compares the magnitude of the largest vector component for each of said $N-2$ error vectors with the test magnitude and indicates if the magnitude of the largest component of any of said $N-2$ error vectors exceeds the test magnitude or if the magnitude of the largest vector component of said $N-2$ error vectors are each less than the test magnitude, and wherein said line segment generator receives the Bézier control points $P_1$ and $P_N$ and, upon indication from said comparator that the magnitudes of the largest vector component of said $N-2$ error vectors are each less than the test magnitude, generating said plurality of data values.

42. The system of claim 41, further including a Bézier curve renderer to subdivide the Bézier curve to generate a second set of N sequential Bézier control points, representative of a portion of the Bézier curve, and provides said second set of control points to said vector generator if said comparator indicates that the magnitude of the largest vector component of any of said $N-2$ error vectors exceeds the test magnitude.

* * * * *

UNITED STATES PATENT AND TRADEMARK OFFICE
CERTIFICATE OF CORRECTION

PATENT NO. : 5,363,479

DATED : November 8, 1994

INVENTOR(S) : Kirk O. Olynyk

It is certified that error appears in the above-identified patent and that said Letters Patent is hereby corrected as shown below:

In column 16, claim 12, line 35, please delete "type".

In column 22, claim 31, line 39, after "and" and before "Bézier", please insert --fourth--.

Signed and Sealed this

Seventh Day of March, 1995

Attest:

BRUCE LEHMAN

Attesting Officer     Commissioner of Patents and Trademarks